United States Patent [19]

Homma et al.

[11] 3,989,767

[45] Nov. 2, 1976

[54] POWDER COATING RESIN COMPOSITIONS OF GLYCIDYL COPOLYMERS HAVING AN INTERNAL FLOWING AGENT

[75] Inventors: Minoru Homma, Sakai; Akio Shoji, Osaka; Hidehisa Nakamura, Osaka, all of Japan

[73] Assignee: Dainippon Ink & Chemicals, Incorporated, Tokyo, Japan

[22] Filed: Feb. 28, 1975

[21] Appl. No.: 554,098

[30] Foreign Application Priority Data

Mar. 5, 1974 Japan.............................. 49-24800
July 9, 1974 Japan.............................. 49-77814
Aug. 1, 1974 Japan.............................. 49-87506

[52] U.S. Cl............................ 260/834; 260/830 R; 260/835; 260/836; 260/837 R; 260/861; 260/862
[51] Int. Cl.² ................ C08L 63/02; C08L 63/10; C08L 67/06
[58] Field of Search................ 260/835, 834, 830 R, 260/861, 862, 836, 837 R

[56] References Cited
UNITED STATES PATENTS

| | | | |
|---|---|---|---|
| 2,781,333 | 2/1957 | Updegraff............................ | 260/835 |
| 3,060,147 | 10/1962 | Schlegel.............................. | 260/835 |
| 3,523,143 | 8/1970 | Kwong................................ | 260/835 |
| 3,574,157 | 4/1971 | Markus............................... | 260/835 |
| 3,723,569 | 3/1973 | Hoeschele........................... | 260/835 |
| 3,781,379 | 12/1973 | Theodore et al. ................... | 260/836 |

*Primary Examiner*—Murray Tillman
*Assistant Examiner*—Thurman K. Page
*Attorney, Agent, or Firm*—Sherman & Shalloway

[57] ABSTRACT

A powder coating resin composition comprising (A) 10 to 90% by weight of a glycidyl- or methyl glycidyl-containing copolymer and (B) 90 to 10% by weight of a polycarboxylic compound, said copolymer (A) being prepared by polymerizing (1) 5 to 40% by weight of at least one ethylenically unsaturated monomer selected from the group consisting of glycidyl-containing ethylenically unsaturated monomers and methyl glycidyl-containing ethylenically unsaturated monomers and (2) 20 to 90% by weight of at least one other ethylenically unsaturated monomer in the presence of (3) 5 to 40% by weight of a polyester resin containing an ethylenically unsaturated bond and having an acid number of not more than 10 KOH mg/g and a hydroxyl number of 20 to 300 KOH mg/g, said polyester resin being derived from 0.1–10 equivalent percent of an ethylenically unsaturated polycarboxylic acid, 30 to 49.9 equivalent percent of a polycarboxylic acid not containing an ethylenically unsaturated bond and 50 to 65 equivalent percent of a polyhydric alcohol.

10 Claims, No Drawings

POWDER COATING RESIN COMPOSITIONS OF GLYCIDYL COPOLYMERS HAVING AN INTERNAL FLOWING AGENT

This invention relates to a powder coating resin composition capable of giving a coating with superior smoothness, gloss, salt water resistance and mechanical strength.

Resin compositions for powder coating comprising glycidyl-containing ethylenically unsaturated monomers and other ethylenically unsaturated monomers and as a curing agent, aliphatic dibasic acids or carboxyl-terminated linear polyesters are disclosed, for example, in the specifications of U.S. Pat. Nos. 3,730,930, 3,781,380 and 3,787,521. However, coatings prepared from such powder coating compositions have the defect of inferior smoothness, gloss, corrosion resistance and mechanical strength.

It is an object of this invention to provide powder coating resin compositions free from such defects.

We have found that the above defects can be greatly eliminated by modifying the above copolymer with a polyester resin, and an especially feasible method for performing this modification comprises preparing the above copolymer in the presence of a specific polyester resin cotaining an ethylenically unsaturated bond.

According to this invention, there is provided a powder coating resin composition comprising (A) a glycidyl- and/or methylglycidyl-containing copolymer (to be referred to hereinbelow as "a glycidyl copolymer") and (B) a polycarboxylic compound as a curing agent, said copolymer (A) being prepared by polymerizing (1) 5 to 40% by weight of a glycidyl-containing ethylenically unsaturated monomer and/or a methylglycidyl-containing ethylenically unsaturated monomer (to be referred to hereinbelow as "a glycidyl monomer") and (2) 20 to 90% by weight of at least one other ethylenically unsaturated monomer in the presence of (3) 5 to 40% by weight of a polyester resin containing an ethylenically unsaturated bond (to be referred to hereinbelow as "an unsaturated polyester resin") and having an acid number of 10 KOH mg/g (the unit being omitted hereinbelow) and a hydroxyl number of 20 to 300 KOH mg/g (the unit being omitted hereinbelow) derived from 0.1 to 10 equivalent % of an ethylenically unsaturated polycarboxylic acid, 30 to 49.9 equivalent percent of a polycarboxylic acid free from an ethylenically unsaturated bond and 50 to 65 equivalent percent of a polyhydric alcohol.

The invention also provides a powder coating resin composition comprising (A) the glycidyl copolymer mentioned above, (B) the polyvalent carboxy compound mentioned above, and (C) an amino resin or (D) a blocked polyisocyanate as an auxiliary curing agent.

The auxiliary curing agent, as used herein, denotes a curing agent which participates in the curing reaction that proceeds simultaneously with a curing reaction caused by the polycarboxylic compound (B) as a main curing agent in order to strengthen the curing of the composition by the main curing agent.

It is not entirely clear why the composition of this invention has the superior properties mentioned above, but we assume that it can be ascribed to the following causes.

i. As the modifying component markedly improves the compatibility of the glycidyl copolymer (A) with the polycarboxylic compound (B) as a curing agent, the reaction between the glycidyl group and/or methylglycidyl group and the carboxyl groups (including an acid anhydride group) and the reaction between hydroxyl groups and the carboxyl groups, that is, a curing reaction, occur uniformly and sufficiently, and as a result, a coating having superior gloss, salt resistance, and mechanical strength can be formed.

ii. The glycidyl copolymer (A) as a base resin is modified with the unsaturated polyester resin, and since this modifying component acts as an internal flowing agent, a coating of great smoothness is formed.

iii. When the amino resin (C) is further used as an auxiliary curing agent, a curing reaction between the hydroxyl groups and the methylol group and/or alkyl ether group and a self-curing reaction of the amino resin also take place, and as a result, the mechanical strength and the salt water resistance of the resulting coating are strikingly improved. The hydroxyl groups, as used herein, include the hydroxyl groups inherently possessed by an unsaturated polyester resin as the modifying component and a hydroxyl group-containing monomer as the other ethylenically unsaturated monomer, and the hydroxyl groups resulting from the reaction of the glycidyl copolymer and the polycarboxylic compound.

iv. When the blocked polyisocyanate (D) is further used as an auxiliary curing agent, a curing reaction occurs between the above hydroxyl groups and the isocyanate group, and therefore, the salt resistance of the coating is greatly improved.

The unsaturated polyester resin (3) used as one raw material of the glycidyl copolymer (A) is a polyester resin containing an ethylenically unsaturated bond having an acid number of not more than 10, preferably not more than 5 and a hydroxyl number of 20 to 300 which is obtained by reacting 0.1 to 10 equivalent percent, preferably 0.5 to 5 equivalent percent of an ethylenically unsaturated polycarboxylic acid, 30 to 49.9 equivalent percent, preferably 35 to 45 equivalent percent of a polycarboxylic acid not containing an ethylenically unsaturated bond and 50 to 65 equivalent percent, preferably 53 to 60 equivalent percent of a polyhydric alcohol. The ethylenically unsaturated bond of this resin participates in a copolymerization reaction with the ethylenically unsaturated bond of another material. Since the hydroxyl groups contained in this polyester resin act as part of cross-linking functional groups when an auxiliary curing agent is used, the amount of the hydroxyl groups should be as large as possible. However, if the amount becomes so large that the hydroxyl number exceeds 300, the chemical resistance of the coating becomes inferior. On the other hand, if it is so small that the hydroxyl number is less than 20, the properties of the resulting coating become inferior. If the acid number of the polyester resin exceeds 10, the glycidyl copolymer is gelled during preparation.

The ethylenically unsaturated polycarboxylic acid is a polycarboxylic acid or its anhydride containing one ethylenically unsaturated bond, and includes, for example, maleic acid, fumaric acid, itaconic acid, or anhydride of these. Examples of the polycarboxylic acids free from an ethylenically unsaturated bond are aromatic carboxylic acids or their derivatives such as o-, m- and p-phthalic acids or methyl esters of these, trimellitic acid or pyromellitic acid; aliphatic carboxylic acids such as succinic acid, adipic acid or sebacic acid;

alicyclic carboxylic acids such as o-, m- and p-tetrahydrophthalic acids; and the anhydrides of the above carboxylic acids. Examples of the polyhydric alcohols containing no ethylenically unsaturated bond include aliphatic alcohols such as ethylene glycol, propylene glycol, 1,4-butylene glycol, diethylene trimethylol ethane, trimethylol propane or an ethylene oxide adduct of hydrogenated bisphenol A; and alicyclic alcohols such as hydrogenated bisphenol A.

The unsaturated polyester resin (3) can be prepared by any known method for preparing polyester resins except that care should be taken not to polymerize the ethylenically unsaturated polycarboxylic acid. For example, it can be prepared by reacting the raw materials in predetermined proportions at an elevated temperature in the presence or absence of an inert gas with or without a solvent. The amount of the polyester resin to be used is 5 to 40% by weight, preferably 10 to 30% by weight, based on the total amount of the raw materials.

The glycidyl monomer (1), the other raw material, is a glycidyl-containing ethylenically unsaturated monomer or a β-methylglycidyl-containing ethylenically unsaturated monomer. Examples of such monomers include (β-methyl) glycidyl esters of polymerizable carboxylic acids such as (β-methyl) glycidyl esters of (β-meth)acrylic acid or di(β-methyl)glycidyl esters of polymerizable polycarboxylic acids such as maleic acid, fumaric acid or itaconic acid, and (β-methyl)-glycidyl ethers of polymerizable alcohols such as (β-methyl)glycidyl ethers of (β-meth)allyl alcohol. The amount of the glycidyl monomer (1) to be used is 5 to 40%, preferably 15 to 30%, by weight based on the total amount of the raw materials. When only one glycidyl monomer is to be used, it is preferred to use a monomer containing a methylglycidyl group rather than to use a monomer containing a glycidyl group. More preferably, however, a mixture of the glycidyl-containing monomer and the methylglycidyl-containing monomer is used in order to improve the surface condition, physical properties and chemical properties of the coating. When the mixture is used, the amounts of glycidyl-containing monomer and the methylglycidyl-containing monomer to be used are 2 – 10% and 3 – 38%, by weight, respectively, based on the total amount of the raw materials.

The other ethylenically unsaturated monomer (2) denotes an ethylenically unsaturated monomer which does not react with the oxirane group of the glycidyl monomer, or an ethylenically unsaturated monomer which hardly reacts with the oxirane group at the temperature at which the glycidyl copolymer is prepared or a powder coating composition is prepared by kneading. Examples of such monomers include alkyl esters of (meth)acrylic acid such as methyl (meth)acrylate, ethyl (meth)acrylate or butyl (meth)acrylate; hydroxyalkyl esters of (meth)acrylic acid such as β-hydroxyethyl (meth)acrylate or β-hydroxypropyl (meth)acrylate; dialkyl esters of ethylenically unsaturated dicarboxylic acids such as dimethyl maleate, diethyl fumarate or dipropyl itaconate; styrenes such as styrene or vinyl toluene; vinyl compounds such as vinyl acetate or vinyl chloride; and (meth)allyl alcohol. Of these, the hydroxyl-containing monomers are especially advantageous when using an auxiliary curing agent because they serve to introduce hydroxyl groups into the glycidyl copolymer. The amount of the monomer (2) is 20 to 90% by weight, preferably 40 to 75% by weight, based on the total amount of the raw materials.

The glycidyl copolymer (A) can be prepared by polymerizing (1) 5 to 40% by weight of the glycidyl monomer and (2) 20 to 90% by weight of the other ethylenically unsaturated monomer in the presence of (3) 5 to 40% by weight of the unsaturated polyester resin. The polymerization can be effected by any of the known solution-polymerization, suspension-polymerization, and bulk-polymerization methods. In the case of the solution-polymerization, the glycidyl copolymer can be collected by removing the solvent after the reaction. In the case of the suspension-polymerization and the bulk-polymerization, the resulting copolymer can be very easily collected since it is present in the aqueous phase as a solid.

A polymerization initiator may be used in performing the above polymerization. Examples include organic peroxide compounds such as benzoyl peroxide, tert.-butyl perbenzoate or lauroyl peroxide; and azo compounds such as azobisisobutyronitrile.

In the case of the suspension polymerization, a stabilizer may be used. Examples of the stabilizer include inorganic compounds such as calcium phosphate, barium sulfate or magnesium carbonate, or organic compounds such as poly(sodium acrylate), poly(sodium methacrylate), acrylamide copolymers, polyvinyl alcohol, a partially saponified product of polyvinyl acetate, polyvinyl pyrrolidone, carboxymethyl cellulose, starch or gelatin.

Examples of the organic solvent used in the solution polymerization are hydrocarbons such as benzene, toluene, xylene, cyclohexane, heptane or hexane, alcohols such as propanol, butanol or cyclohexanol, esters such as ethyl acetate, ethers such as n-butyl ether, and ketones such as methyl ethyl ketone. These compounds may be used in admixture, as required.

Desirably, the glycidyl copolymer (A) used in this invention has a number average molecular weight of 3,000 to 30,000, preferably 5,000 to 15,000, and a softening point, measured by a ring ball method, of 80° to 150° C., preferably 90° to 120° C.

The polycarboxylic compound (B) used as a curing agent in this invention is a compound having at least two carboxyl groups, for example, carboxylic acids and their anhydrides. In order to form coatings of good quality, however, aliphatic dicarboxylic acids containing 4 to 22 carbon atoms or their anhydrides, such as fumaric acid, maleic acid, malonic acid, succinic acid, sebacic acid, azelaic acid, undecanoic acid, decanedicarboxylic acid, and their anhydrides are preferred to aromatic carboxylic acids or their anhydrides such as o-, m- and p-phthalic acids, trimellitic acid, pyromellitic acid and their anhydrides. These carboxylic acids emit smoke at the time of baking the powder coating composition. Carboxyl-terminated polyester resins as the polycarboxylic compound (B) do not emit smoke at the time of baking. These carboxyl-terminated polyester resins are classified into two types, one being linear polyester resins prepared from dicarboxylic acids and dihydric alcohols, and the other being branched polyester resins prepared from the above materials and carboxylic acids having at least three carboxyl groups and/or alcohols having at least three hydroxyl groups. The linear polyester resins contain two carboxyl groups in total at the ends, whereas the branched polyester resins contain at least three carboxyl groups in total at the ends of the individual branching chains. Since the branched polyester resins have more crosslinking sites for the glycidyl copolymer (A) than the linear polyesters, they can be crosslinked at a higher density and give coatings having superior properties. The carboxyl-terminated polyester resins can be obtained from polyhydric alcohols and polycarboxylic acids in an amount of at least an equivalent amount. They can be also prepared by first preparing hydroxyl-terminated polyester resins from polycarboxylic acids and polyhydric alcohols, and then reacting the reaction product with carboxylic acids or their anhydrides. Alternatively, the hydroxyl-terminated polyester resin and at least an equivalent amount of carboxylic acid or its anhydride can be used in the form of an unreacted mixture in blending with the glycidyl copolymer (A). In this case, the mixture reacts at the time of baking to form a carboxyl-terminated polyester resin which then acts as a curing agent.

Desirably, the carboxyl-terminated polyester resins have an acid number of 20 to 400, preferably 50 to 200, a number average molecular weight of 500 to 5,000, preferably 800 to 3,000, and a softening point, measured by a ring ball method, of 50° to 150° C., preferably 80° to 120° C. It is not necessary at all for these polyester resins to have an ethylenically unsaturated bond.

The method for preparation of these polyesters and their raw materials are the same as those described hereinabove with respect to the unsaturated polyester resins.

The weight ratio of the glycidyl copolymer (A) to the polycarboxylic compound (B) to be mixed is 10:90 to 90:10, preferably 15:85 to 85:15. In terms of the ratio of the number of glycidyl groups and/or methylglycidyl groups to the number of carboxyl groups, this ratio is 1:5 to 5:1, preferably 1:2 to 2:1.

The amino resin (C) used as an auxiliary curing agent is a methylolated amino resin derived from at least one amino compound such as melamine, urea, or benzoguanamine and formaldehyde, an alkyl-etherified amino resin obtained by partially or mostly etherifying the methylolated amino resin, or a cocondensed amino resin obtained by cocondensing them. These amino resins have a number of methylol groups and/or alkyl-etherified methyl groups. Preferred amino resins are hexamethoxymethyl melamine and tetrabutoxymethyl benzoguanamine. These amino resins (C) can be prepared by any known method. The amount of the amino resin (C) to be used is usually 1 to 25 parts by weight, preferably 2 to 15 parts by weight, per 100 parts by weight of the glycidyl copolymer (A).

The blocked polyisocyanate (D) used as an auxiliary curing agent denotes a polyisocyanate adduct in which all of the isocyanate groups are blocked with a blocking agent such as methanol, isopropanol, butanol, ethyl lactate or ε-caprolactam. These compounds dissociate at the baking temperature of the powder coating composition, and become polyisocyanate adduct having free isocyanate groups. The polyisocyanate adducts, as is well known, are products having free isocyanate groups which are obtained by the addition reaction of active hydrogen-containing compounds (such as trimethylol propane, 1 mol) and diisocyanates (such as toluene diisocyanate, 3 mols). Examples of the active hydrogen-containing compounds include low-molecular-weight compounds such as ethylene glycol, propylene glycol, 1,4-butylene glycol, glycerol, trimethylol propane, ethylene diamine or hexamethylene diamine, and high-molecular-weight compounds such as polyacrylic polyols such as a copolymer of β-hydroxyethyl acrylate, polyether polyols, polyester polyols (polyester resins having hydroxyl groups), and polyamides. Examples of useful diisocyanates are aromatic isocyanates such as toluene diisocyanate, xylylene diisocyanate or diphenylmethane diisocyanate, aliphatic isocyanates such as hexamethylene diisocyanate or tetramethylene diisocyanate, and alicyclic isocyanates such as isophorone diisocyanate.

The blocked polyisocyanates (D) can be prepared by any known method. The amount of the blocked polyisocyanate (D) used is usually 1 to 30 parts by weight, preferably 3 to 15 parts by weight, per 100 parts by weight of the glycidyl copolymer (A).

In order to inhibit curing reactions, various inorganic acids, alkalies, or amines can be added to the composition of this invention. Where the blocked polyisocyanate (D) is used as an auxiliary curing agent, a known block-dissociating catalyst, such as an organic acid metal salt, an inorganic or organic tin compound, or a tertiary or quaternary amine, can be added in order to dissociate the blocking. Furthermore, the powder coating composition of this invention can contain various additives known to be useful for powder paints, for example, a polymer of a long-chain alkyl ester of acrylic acid or methacrylic acid, a fluorine-containing polymer, epoxy resin or cellulose acetate butyrate.

The composition of this invention cures sufficiently by heating at at least 150° C., preferably 170° to 240° C.

Powder paint is prepared from the resin composition of this invention by a method which comprises adding a pigment, filler or other additives to the resin composition which has been kneaded in the molten state, kneading them in the molten state, cooling the kneaded mixture, and then pulverizing it; or a method which comprises kneading a mixture of the resin composition and the additives in the molten state, cooling the mixture, and pulverizing it; or a method which involves mixing the resin composition and the additives in a solvent, and then treating the mixture by a spray drier. The powder paint can be coated by any known method such as electrostatic spray coating or fluidized bed coating.

The following Examples illustrate the present invention specifically, in which all parts are by weight.

EXAMPLE 1

Isophthalic acid (550 parts), 46 parts of adipic acid, 186 parts of trimethylol propane, 304 parts of neopentyl glycol and 15 parts of maleic anhydride, with stirring in an atmosphere of an inert gas, were heated at 180° C. for 2 hours, and then at 200° C. for about 7 hours to afford an unsaturated polyester resin (I) having a hydroxyl number of 130 and an acid number of 4.7.

A mixture consisting of 35 parts of styrene, 15 parts of glycidyl methacrylate, 10 parts of methyl glycidyl methacrylate, 20 parts of the unsaturated polyester resin (I), 5 parts of 2-ethylhexyl acrylate, 15 parts of isobutyl methacrylate, 70 parts of xylol, 30 parts of n-butanol, 3 parts of azobisisobutyronitrile and 1 part of tert.-butyl perbenzoate was maintained at 80° C. for 3 hours, heated to 100° C. over the course of 30 hours, and then maintained at this temperature for 7 hours. Then, the solvent was removed to afford a glycidyl polymer having a softening point, as measured by a ring ball method, of 113° C. and a number average molecular weight of 9,500.

The resulting polymer (84 parts), 16 parts of 1,10-decanedicarboxylic acid, 0.5 part of a flowability controlling agent (a polymerization product of 2-ethylhexyl acrylate and ethyl acrylate in a weight ratio of 9:1 having a number average molecular weight of 8,000) and 50 parts of titanium oxide were kneaded at 110° C. for 3 minutes using three heated rolls, cooled, pulverized, and then sieved by a 150-mesh wire screen to afford a powder paint having a particle diameter not greater than 150 mesh.

The powder paint was coated on a mild steel panel by electrostatic spray coating, and baked at 200° C. for 20 minutes.

EXAMPLE 2

A powder paint was prepared and baked in the same way as in Example 1 using 84 parts of the same glycidyl polymer as in Example 1, 12 parts of 1,10-decanedicarboxylic acid, 4 parts of succinic anhydride, 0.5 part of the same flowability controlling agent as used in Example 1, and 50 parts of titanium oxide.

EXAMPLE 3

A powder paint was prepared and baked in the same way as in Example 1 using 79 parts of the same glycidyl polymer as used in Example 1, 16 parts of 1,10-decanedicarboxylic acid, 5 parts of EPICLON 1050 (a bisphenol-type epoxy resin, a product of Dainippon Ink and Chemicals, Inc.), 0.5 part of the same flowability controlling agent as used in Example 1, and 50 parts of titanium oxide.

COMPARATIVE EXAMPLE 1

A polymer was prepared in the same way as in Example 1 from 35 parts of styrene, 20 parts of methyl methacrylate, 15 parts of isobutyl methacrylate, 5 parts of 2-ethylhexyl acrylate, 15 parts of glycidyl methacrylate and 10 parts of methyl glycidyl methacrylate. A powder paint was prepared and baked in the same way as in Example 1 using 84 parts of this polymer, 16 parts of 1,10-decanedicarboxylic acid, 0.5 part of the same flowability controlling agent as used in Example 1, and 50 parts of titanium oxide.

COMPARATIVE EXAMPLE 2

A powder paint was prepared and baked in the same way as in Example 1 using 76 parts of the same polymer as used in Comparative Example 1, 10 parts of the unsaturated polyester resin (I), 14 parts of 1,10-decanedicarboxylic acid, 0.5 part of the same flowability controlling agent as used in Example 1 and 50 parts of titanium oxide.

EXAMPLE 4

Isophthalic acid (410 parts), 110 parts of trimethylol ethane, 250 parts of 1,5-hexanediol and 14 parts of maleic anhydride, with stirring in an atmosphere of an inert gas, were heated at 180° C. for 2 hours, and then at 220° C. for about 8 hours to afford an unsaturated polyester resin (II) having a softening point, as measured by a ring ball method, of 95° C. an acid number of 2 and a hydroxyl number of 120.

With stirring, 2 parts of calcium acetate and 0.5 part of sodium sulfite were added to a mixture of 3 parts of triammonium phosphate and 200 parts of water heated at 50° C. The temperature was then raised to 60° C., and 40 parts of styrene, 30 parts of the unsaturated polyester resin (II), 10 parts of glycidyl methacrylate, 10 parts of methyl glycidyl methacrylate, 20 parts of isobutyl methacrylate, 4 parts of azobisisobutyronitrile, 1 part of tert.-butyl perbenzoate and 1 part of n-lauryl mercaptan were added to the mixture in an atmosphere of nitrogen. The mixture was maintained at this temperature for 3 hours, gradually heated to 80° C., and further maintained at this temperature for 15 hours. The reaction product was separated, washed with water and dried to afford a glycidyl polymer having a softening point, as measured by a ring ball method, of 110° C. and a number average molecular weight of 8,300.

The resulting glycidyl polymer (81 parts), 14 parts of 1,10-decanedicarboxylic acid, 5 parts of hexamethoxymethyl melamine, 0.5 part of the same flowability controlling agent as used in Example 1 and 50 parts of titanium oxide were kneaded at 100° C. for 3 minutes using three heated rolls, cooled, pulverized, and then sieved with a 150-mesh wire screen to afford a powder paint having a particle diameter not greater than 150 mesh.

The resulting powder paint was coated on a mild steel panel by electrostatic spray coating, and baked at 200° C. for 20 minutes.

EXAMPLE 5

A powder paint was prepared and baked in the same way as in Example 4 using 75 parts of the same glycidyl polymer as used in Example 4, 15 parts of 1,10-decanedicarboxylic acid, 5 parts of hexamethoxymethyl malamine, 5 parts of EPICLON 850 (a bisphenol-type epoxy resin, a product of Dainippon Ink and Chemicals, Ind.), 0.5 part of the same flowability controlling agent as used in Example 1, and 50 parts of titanium oxide.

EXAMPLE 6

Dimethyl terephthalate (350 parts), 40 parts of adipic acid, 90 parts of trimethylol propane, 200 parts of neopentyl glycol, 8 parts of maleic anhydride and 0.5 part of zinc acetate were heated at 150° C. and then heated from 150° C. to 210° C. over the course of 7 hours and then maintained at 210° C. and 2 mmHg for 2 hours, while removing the by-product methanol out of the reaction system, to afford an unsaturated polyester resin (III) having a softening point of 97° C., a hydroxyl number of 125, and an acid number of 1.3.

A glycidyl polymer having a softening point, as measured by a ring ball method, of 110° C. and a number average molecular weight of 8,500 was prepared in the same way as in Example 4 using 35 parts of styrene, 30 parts of the unsaturated polyester resin (III), 7 parts of glycidyl methacrylate, 8 parts of methyl glycidyl methacrylate, 10 parts of isobutyl methacrylate and 10 parts of β-hydroxypropyl methacrylate.

A powder paint was prepared and baked in the same way as in Example 4 using 81 parts of the resulting glycidyl polymer, 9 parts of 1,10-decanedicarboxylic acid, 10 parts of hexamethoxymethyl melamine, 0.5 part of the same flowability controlling agent as used in Example 1, and 50 parts of titanium oxide.

EXAMPLE 7

Isophthalic acid (410 parts), 110 parts of trimethylol ethane, 220 parts of neopentyl glycol and 8 parts of maleic anhydride, with stirring in an atmosphere of an inert gas, were heated at 180° C. for 2 hours, and then at 220° C. for about 8 hours to afford an unsaturated polyester resin (IV) having a softening point, as measured by a ring ball method, of 92° C., a hydroxyl number of 12.2, and an acid number of 1.9.

With stirring, 2 parts of calcium acetate and 0.5 part of sodium sulfite were added to a mixture of 3 parts of triammonium phosphate and 200 parts of water heated at 50° C. The mixture was heated to 60° C., and in an atmosphere of nitrogen, 30 parts of styrene, 20 parts of the unsaturated polyester resin (IV), 10 parts of glycidyl methacrylate, 10 parts of methyl glycidyl methacrylate, 10 parts of methyl methacrylate, 20 parts of isobutyl methacrylate, 4 parts of azobisisobutyronitrile, 1 part of tert.-butyl perbenzoate and 1 part of n-lauryl mercaptan were added. The resulting mixture was maintained at this temperature for 3 hours, heated to 80° C. gradually, and further maintained at this temperature for 15 hours. The resulting product was separated, washed with water, and dried to afford a glycidyl polymer having a softening point, as measured by a ring ball method, of 115° C., and a number average molecular weight of 9,000.

The resulting glycidyl polymer (81 parts), 14 parts of 1,10-decaedicarboxylic acid, 5 parts of blocked polyisocyanate obtained by blocking an adduct of 1 mol of trimethylol propane and 3 mols of xylylene diisocyanate with methanol, 1 part of dibutyl tin dichloride, 0.5 part of the same flowability controlling agent as used in Example 1, and 50 parts of titanium oxide were kneaded at 100° C. for 3 minutes using three heated rolls, cooled, pulverized, and sieved with a 150-mesh wire screen to afford a powder paint having a particle diameter not greater than 150 mesh.

The resulting powder paint was coated on a mild steel panel by electrostatic spray coating, and baked at 200° C. for 20 hours.

EXAMPLE 8

A powder paint was prepared and baked in the same way as in Example 7 using 75 parts of the glycidyl polymer obtained in Example 7, 15 parts of 1,10-decanedicarboxylic acid, 5 parts of a blocked isocyanate compound obtained by blocking an adduct of 1 mol of trimethylol propane and 3 mols of isophorone diisocyanate with ε-caprolactam, 1 part of dibutyl tin dichloride, 0.5 part of the same flowability controlling agent as used in Example 1, and 50 parts of titanium oxide.

EXAMPLE 9

Dimethyl terephthalate (350 parts), 40 parts of adipic acid, 90 parts of trimethylol propane, 220 parts of 1,6-hexanediol, 10 parts of meleic anhydride and 0.5 part of zinc acetate were heated up to 210° C. over the course of 7 hours and maintained at this temperature and a pressure of 2 mmHg for 2 hours while removing the by-product methanol out of the reaction system, thereby to afford an unsaturated polyester resin having a softening point, as measured by a ring ball method, of 90° C., a hydroxyl number of 110 and an acid number of 1.5.

A glycidyl polymer having a softening point, as measured by a ring ball method, of 101° C. and a number average molecular weight of 8,300 was prepared in the same way as in Example 7 by polymerizing 30 parts of styrene, 30 parts of the unsaturated polyester resin (V), 7 parts of glycidyl methacrylate, 8 parts of methyl glycidyl methacrylate, 10 parts of ethyl methacrylate and 15 parts of isobutyl methacrylate.

A powder paint was prepared and baked in the same way as in Example 7 using 81 parts of the resulting glycidyl polymer, 10 parts of the same blocked polyisocyanate as used in Example 7, 1 part of dibutyl tin dichloride, 0.5 part of the same flowability controlling agent as used in Example 1, and 50 parts of titanium oxide.

EXAMPLE 10

The procedure of Example 4 was repeated except that 40 parts of styrene, 20 parts of the unsaturated polyester resin (I), 20 parts of glycidyl methacrylate, 25 parts of iso-butyl methacrylate, 4 parts of azobisisobutyronitrile, 1 part of tert.-butyl perbenzoate and 2 parts of tert.-lauryl mercaptan were used. Thus a glycidyl polymer having a softening point, as measured by a ring ball method, of 115° C. and a number average molecular weight of 7000 was prepared.

A powder paint was prepared and baked in the same way as in Example 1 using 85 parts of the above glycidyl polymer. 15 parts of 1,10-decanedicarboxylic acid, 0.5 part of the same flowability controlling agent as used in Example 1 and 43 parts of titanium oxide.

EXAMPLE 11

The procedure of Example 4 was repeated except that 35 parts of styrene, 20 parts of the unsaturated polyester resin (I), 25 parts of methylglycidyl methacrylate, 20 parts of isobutyl methacrylate, 4 parts of azoisobutyronitrile, 1 part of tert.-butyl perbenzoate and 2 parts of tert.-lauryl mercaptan were used. Thus a glycidyl polymer having a softening point, as measured by a ring and ball method, of 108° C. and a number average molecular weight of 6500 was prepared.

A powder paint was prepared and baked in the same way as Example 10.

EXAMPLE 12

Isophthalic acid (600 parts), 190 parts of trimethylol propane, 360 parts of 1,6-hexanediol and 10 parts of maleic anhydride were heated at 180° C. for 2 hours and then at 200° C. for about 7 hours, while stirring them in an atmosphere of an inert gas. There was obtained an unsaturated polyester resin (VI) having a softening point of 88° C., a molecular weight of 1,300, a hydroxyl number of 160 and an acid number of 3.0.

Neopentyl glycol (157 parts), 148 parts of trimethylol propane, 695 parts of isophthalic acid and 1 part of dibutyl tin oxide were heated at 160° C. The temperature was gradually raised to 220° C., and the mixture was maintained at this temperature for 20 hours to afford a polyester resin A having an acid number of 130, a softening point of 105° C. and a number average molecular weight of 1,800.

With stirring, 2 parts of calcium acetate and 0.5 part of sodium sulfite were added to a mixture consisting of 3 parts of triammonium phosphate and 200 parts of water heated at 50° C. The mixture was heated to 60° C., and in an atmosphere of nitrogen, 35 parts of styrene, 10 parts of glycidyl methacrylate, 10 parts of methyl glycidyl methacrylate, 20 parts of the unsaturated polyester VI, 25 parts of isobutyl methacrylate, 4 parts of azobisisobutyronitrile, 1 part of tert.-butyl perbenzoate and 3 parts of N-lauryl mercaptan. The mixture was maintained at this temperature for 3 hours, and then gradually heated to 80° C. It was further maintained at this temperature for 15 hours, and the resulting product was separated, washed with water and dried to afford a resin having a softening point of 112° C. and a number average molecular weight of 7,000.

50 parts of the above glycidyl polymer, 50 parts of the polyester resin A, 0.5 part of the same flowability controlling agent as used in Example 1, and 50 parts of titanium oxide were kneaded for 3 minutes by means of three rolls heated at 100° C. The kneaded mixture was cooled, and separated by a 150-mesh wire gauze to form a powder having a particle size smaller than 150 mesh.

The resulting powder was coated on a mild steel panel by electrostatic spray coating, and baked at 200° C. for 20 minutes to form a coated film.

EXAMPLE 13

Dimethyl terephthalate (640 parts), 90 parts of trimethylol propane, 360 parts of 1,6-hexanediol and 0.3 part of zinc acetate were charted, and while removing the by-product methanol out of the reaction system, they were heated from 150° to 210° C. over the course of 7 hours and then maintained at 210° C. and 2 mmHg for 2 hours to afford a polyester having a hydroxyl number of 90.

700 parts of this polyester was reacted with 100 parts of trimellitic anhydride at 160° C. to afford a polyester resin B having an acid number of 70, a softening point of 110° C. and a number average molecular weight of 2,100.

A powder paint was prepared and baked in the same way as in Example 12 using 70 parts of the glycidyl polymer obtained in Example 12, 20 parts of the polyester resin B, 0.5 part of the same flowability controlling agent as used in Example 1, and 50 parts of titanium oxide.

EXAMPLE 14

An unsaturated polyester resin (VII) having a softening point of 90° C., a number average molecular weight of 1,700, a hydroxyl number of 115 and an acid number of 2.0 was prepared in the same way as in the preparation of the unsaturated polyester resin (VI), using 400 parts of isophthalic acid, 60 parts of trimethylol propane, 195 parts of neopentyl glycol, 5 parts of maleic anhydride and 0.5 part of zinc acetate.

A polymer having a softening point of 110° C. and a molecular weight of 7900 was prepared in the same way as in Example 12 using 40 parts of styrene, 12 parts of glycidyl methacrylate, 13 parts of methyl glycidyl methacrylate, 20 parts of the unsaturated polyester resin (VII) and 15 parts of isobutyl methacrylate.

A powder paint was prepared and baked in the same way as in Example 12 using 40 parts of the above glycidyl polymer, 60 parts of the polyester resin A, 0.5 part of the same flowability controlling agent as in Example 1 and 50 parts of titanium oxide.

COMPARATIVE EXAMPLE 3

The procedure of Example 12 was repeated except that all the unsaturated polyester resin (VI) used in Example 12 was replaced by isobutyl methacrylate. There was obtained a resin having a softening point of 113° C. and a number average molecular weight of 8,200.

A powder paint was prepared and baked in the same way as in Example 12, using 50 parts of the above resin, 50 parts of the polyester resin A, 0.5 part of the same flowability controlling agent as used in Example 1 and 50 parts of titanium oxide.

The properties of the coatings obtained in the above examples are shown in the following table.

| Example | Smoothness | 60° Specular gloss | Erichsen (mm) | Impact resistance (cm) | Toluene rubbing (cycles) | Salt spray (mm) | Bending (mm) |
|---|---|---|---|---|---|---|---|
| 1 | Excellent | 90 | >7 | 20 | >100 | 8 | 10 |
| 2 | '' | 90 | >7 | 20 | >100 | 8 | 10 |
| 3 | '' | 94 | >7 | 20 | >100 | 6 | 10 |
| 4 | '' | 92 | >7 | 50 | >100 | 3 | 6 |
| 5 | '' | 94 | >7 | 50 | >100 | 2 | 4 |
| 6 | '' | 91 | >7 | 50 | >100 | 2 | 4 |
| 7 | '' | 92 | >7 | 40 | >100 | 2 | 10 |
| 8 | '' | 94 | >7 | 30 | >100 | 1 | 10 |
| 9 | '' | 93 | >7 | 40 | >100 | 3 | 10 |
| 10 | Good | 86 | 5 | 20 | >100 | 8 | 10 |
| 11 | Fair | 90 | 7 | 30 | >100 | 6 | 10 |
| 12 | Excellent | 91 | >7 | 50 | >100 | 2 | 4 |
| 13 | '' | 92 | >7 | 50 | >100 | 1 | 4 |
| 14 | '' | 94 | >7 | 50 | >100 | 1 | 4 |
| Comparative Example | | | | | | | |
| 1 | Poor | 84 | <1 | <10 | >100 | >10 | >10 |
| 2 | '' | 40 | <1 | <10 | >100 | >10 | >10 |
| 3 | '' | 30 | <1 | <10 | | | >10 |

These properties were measured by the following methods.

Smoothness
Evaluated visually.

60° Specular Gloss
Using a reflection index measuring apparatus, the index of reflection of a sample coating was measured when the angle of incidence and the angle of reflection from a light source were 60° respectively. When light is perfectly reflected, this value is 100.

Erichsen
A 8 mm-thick mild rolled steel panel coated with the resin composition on one surface was fixed, and pushed from the side of the uncoated surface at a speed of 0.1 mm/second by means of a 20 mm-diameter punch in a direction at right angles to the surface until cracks occurred in the coating. The distance over which the steel panel was pushed during this time was measured.

Impact Resistance
A steel ball, one-half inch in diameter, was placed on the coating, and a load weighing 1 kg was let fall onto the steel ball from various heights. The drop height of the load at a time when the coating peeled off from the substrate was measured.

Toluene Rubbing

The coated surface of a sample was strongly rubbed with an adsorbent cotton soaked with toluene until the coating was peeled off. The number of rubbing cycles required until then was measured.

Salt Spray

The coated surface of a sample was cut in an X-shape, and a 5% salt water was sprayed to the coated surface at 35° C. for 1,000 hours. Then a Cellophane tape was adhered to the cut portion, and peeled off from it. The peel width of the coating was measured.

Bending

A round steel rod with varying diameters was contacted with the back surface of the coated steel panel, and the steel panel was bent along the periphery of the steel rod. By this procedure, the crack resistance of the coating was measured. The test was carried out while varying the round steel rod from one having a diameter of 10 mm to one having a diameter of 8 mm, 6 mm, 4 mm and 2 mm respectively in decreasing order. The crack resistance was expressed by the diameter of a round steel rod that had the smallest diameter among those rods which did not cause cracking of the coating at the time of bending.

What we claim is:

1. A powder coating resin composition comprising (A) 10 to 90% by weight of a glycidyl- or methyl glycidyl-containing copolymer and (B) 90 to 10% by weight of a polycarboxylic compound, said copolymer (A) being prepared by polymerizing (1) 5 to 40% by weight of at least one ethylenically unsaturated monomer selected from the group consisting of glycidyl-containing ethylenically unsaturated monomers and methyl glycidyl-containing ethylenically unsaturated monomers and (2) 20 to 90% by weight of at least one other ethylenically unsaturated monomer in the presence of (3) 5 to 40% by weight of a polyester resin containing an ethylenically unsaturated bond and having an acid number of not more than 10 KOH mg/g and a hydroxyl number of 20 to 300 KOH mg/g, said polyester resin being derived from 0.1 – 10 equivalent % of an ethylenically unsaturated polycarboxylic acid, 30 to 49.9 equivalent % of a polycarboxylic acid not containing an ethylenically unsaturated bond and 50 to 65 equivalent % of a polyhydric alcohol.

2. The powder coating resin composition of claim 1 wherein said polycarboxylic compound (B) is an aliphatic dicarboxylic acid containing 4 to 22 carbon atoms.

3. The powder coating resin composition of claim 1 wherein said polycarboxylic compound (B) is a carboxyl-terminated polyester resin derived from a polyhydric alcohol and a polycarboxylic acid.

4. The powder coating resin composition of claim 1 which further contains (C) 1 to 25 parts by weight, per 100 parts by weight of said copolymer (A), of an amino resin.

5. The powder coating resin composition of claim 1 which further contains (D) 1 to 30 parts by weight per 100 parts by weight of said copolymer (A), of a blocked polyisocyanate.

6. The powder coating resin composition of claim 1 wherein said polyester resin is derived from an ethylenically unsaturated polycarboxylic acid selected from the group consisting of maleic acid, fumaric acid, and itaconic acid or the anhydrides of these acids; a polycarboxylic acid not containing an ethylenically unsaturated bond selected from the group consisting of aromatic carboxylic acids, methylester of aromatic carboxylic acid, aliphatic carboxylic acid, and alicyclic carboxylic acid and the anhydrides of said carboxylic acids and a polyhydric alcohol containing no ethylenically unsaturated bonds selected from the group consisting of ethylene glycol, propylene glycol, 1,4-butyleneglycol, diethylenetrimethylolethane, trimethylolpropane, ethylene oxide adduct of hydrogenated bisphenol A and hydrogenated bisphenol A.

7. The powder coating resin composition of claim 1 wherein said copolymer (A) is prepared by polymerizing (1) a mixture of said glycidyl-containing ethylenically unsaturated monomer and said methylglycidyl-containing ethylenically unsaturated monomer and (2) an ethylenically unsaturated monomer selected from the group consisting of methyl acrylate, methyl methacrylate, ethyl acrylate, ethyl methacrylate, butyl acrylate, butyl methacrylate, $\beta$-hydroxyethyl acrylate, $\beta$-hydroxyethyl methacrylate, $\beta$-hydroxypropyl acrylate, $\beta$-hydroxypropyl methacrylate, dimethyl maleate, diethyl fumarate, dipropyl itaconate, styrene, vinyl toluene, vinyl acetate, vinyl chloride, allyl alcohol and methallyl alcohol and (3) said polyester resin.

8. The powder coating resin composition of claim 7 wherein said copolymer (A) has a number average molecular weight of 3,000 to 30,000, and a softening point, measured by a ring ball method, of 80° to 150° C.

9. The powder coating resin composition of claim 4 wherein said amino resin (C) is selected from the group consisting of hexamethoxymethyl melamine and tetrabutoxymethyl benzoguanamine.

10. The powder coating resin composition of claim 1 wherein copolymer (A) is the reaction product of (1) glycidyl methacrylate and methyl glycidyl methacrylate with (2) styrene, 2-ethylhexylacrylate and isobutylmethacrylate and (3) an unsaturated polyester resin which is the reaction product of isophthalic acid, adipic acid, trimethylol propane, neopentyl glycol and maleic anhydride, and wherein said polycarboxylic compound (B) is 1, 10-decanedicarboxylic acid.

* * * * *

UNITED STATES PATENT AND TRADEMARK OFFICE
CERTIFICATE OF CORRECTION

PATENT NO. : 3,989,767
DATED : November 2, 1976
INVENTOR(S) : Minoru Homma et al.

It is certified that error appears in the above—identified patent and that said Letters Patent are hereby corrected as shown below:

Item 30, line 3, delete "49-77814", insert -- 49-77817 --

Signed and Sealed this

First Day of February 1977

[SEAL]

*Attest:*

RUTH C. MASON
*Attesting Officer*

C. MARSHALL DANN
*Commissioner of Patents and Trademarks*